(12) United States Patent
Sherstobitov et al.

(10) Patent No.: US 7,463,666 B2
(45) Date of Patent: Dec. 9, 2008

(54) LASER WITH HYBRID-UNSTABLE RING RESONATOR

(75) Inventors: Vladimir Evgenyevich Sherstobitov, St. Petersburg (RU); Andrey Yuryevich Rodionov, St. Petersburg (RU)

(73) Assignee: Prima Industrie S.p.A., Collegno TO (IT)

( * ) Notice: Subject to any disclaimer, the term of this patent is extended or adjusted under 35 U.S.C. 154(b) by 163 days.

(21) Appl. No.: 10/555,545

(22) PCT Filed: May 7, 2003

(86) PCT No.: PCT/RU03/00220

§ 371 (c)(1),
(2), (4) Date: Nov. 4, 2005

(87) PCT Pub. No.: WO2004/100328

PCT Pub. Date: Nov. 18, 2004

(65) Prior Publication Data

US 2007/0019701 A1    Jan. 25, 2007

(51) Int. Cl.
*H01S 3/08* (2006.01)
(52) U.S. Cl. .............................. 372/95; 372/92; 372/94; 372/99; 372/107
(58) Field of Classification Search .................. 372/92, 372/94, 95, 99, 107
See application file for complete search history.

(56) References Cited

U.S. PATENT DOCUMENTS

| | | | | |
|---|---|---|---|---|
| 4,267,524 A | * | 5/1981 | Paxton et al. ................. | 372/95 |
| 4,399,543 A | * | 8/1983 | Oughstun ..................... | 372/95 |
| 4,924,476 A | * | 5/1990 | Behfar-Rad et al. ........... | 372/94 |
| 5,157,684 A | * | 10/1992 | Benda et al. .................. | 372/95 |
| 5,381,436 A | * | 1/1995 | Nelson et al. ................. | 372/94 |
| 6,680,961 B2 | * | 1/2004 | Behfar ......................... | 372/94 |
| 2003/0026317 A1 | * | 2/2003 | Behfar ......................... | 372/94 |

OTHER PUBLICATIONS

Textbook: "Laser Fundamentals", second edition, Cambridge University Press, p. 434-439.*

* cited by examiner

*Primary Examiner*—Minsun Harvey
*Assistant Examiner*—Yuanda Zhang
(74) *Attorney, Agent, or Firm*—Heslin Rothenberg Farley & Mesiti P.C.; Victor A. Cardona, Esq.

(57) ABSTRACT

A unidirectional ring laser oscillator has a travelling wave unstable mode in one transverse dimension and either a waveguide or freespace Gaussian mode in the orthogonal transverse dimension for coupling to large volumes of asymmetric cross section laser gain media. This device concept is shown to have unique and innovative features such as an exchange of left for right in the intracavity radiation profile without having to employ concave optics. Also, a high insensitivity to misalignment of one of the intracavity ring optics is achieved without having to suffer any deleterious effects associated with the high intensity of radiation normally encountered at an intracavity focal plane. Unidirectional operation of the laser is achieved using both intracavity and extracavity optical techniques.

10 Claims, 3 Drawing Sheets

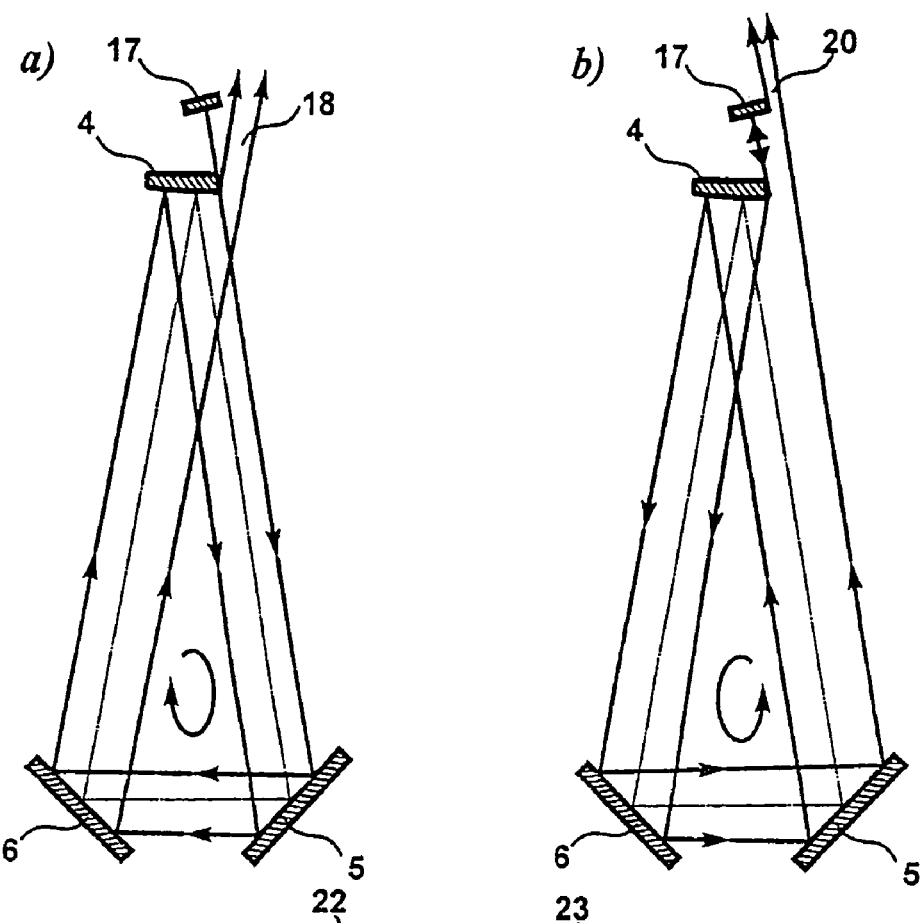
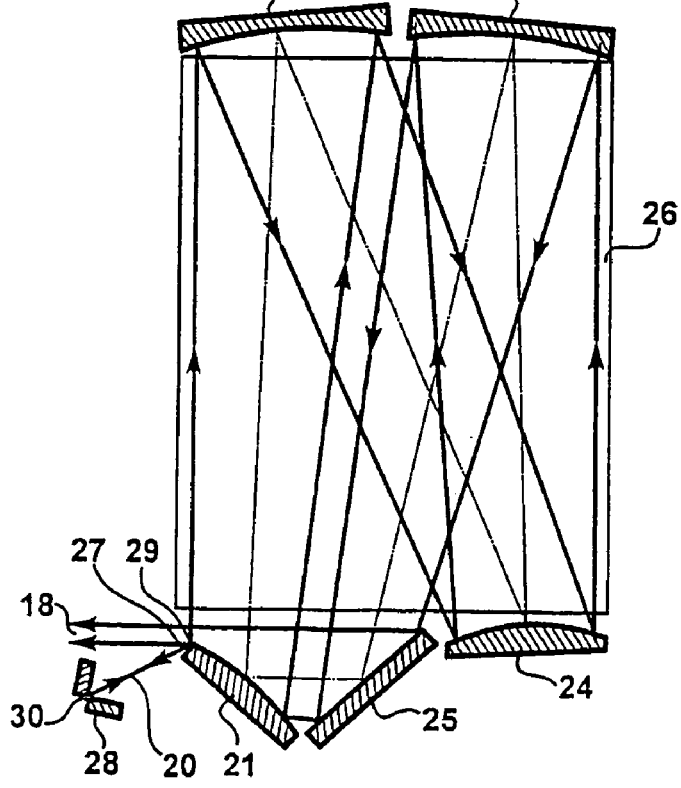
Fig. 5
Fig. 6

LASER WITH HYBRID-UNSTABLE RING RESONATOR

CROSS REFERENCE TO RELATED APPLICATIONS

This application is a national stage of PCT International Application No. PCT/RU2003/000220, filed on May 7, 2003, and published in English on Nov. 18, 2004, as WO 2004/1 00328 A1, the entire disclosure of which is incorporated herein by reference.

BACKGROUND OF THE INVENTION

1. Field of the Invention

The present invention relates to the generation of single or low order transverse mode coherent light from large volumes of asymmetric transverse cross section laser gain media to produce a filled-in, diffractively coupled output beam. This is accomplished by using a hybrid travelling wave unstable resonator. In general, it is well known that symmetric transverse cross section or asymmetric transverse cross section standing wave unstable resonators have superior transverse mode discrimination characteristics compared with stable standing wave resonators. Utilization of hybrid unstable ring resonators is shown in this disclosure to have features not obtainable using hybrid standing wave unstable optical cavities. For example, it is widely believed that hybrid negative branch standing wave unstable resonators uniquely achieve their high level of insensitivity to end-mirror misalignment because of the reversal of left-for-right that occurs at the focal plane of a concave mirror pair. Indeed, this is the reason that hybrid negative branch standing wave unstable cavities are said to be favored over hybrid positive branch standing wave cavities in some laser applications. However, this disclosure shows that the desirable intracavity left-for-right exchange feature and a low sensitivity to cavity misalignment can be achieved in a hybrid travelling wave cavity without having the deleterious characteristics associated with an intracavity focal plane. Likewise, because the cavity is travelling wave, spatial hole burning effects in some laser media are eliminated. Moreover, since the present invention is confined to a resonator unstable in one plane only, does not employ a bifurcated waveguide geometry, and is preferred to have all reflecting optics, the concept disclosed herein is scalable to very high average laser output powers. Accordingly, the general objects of the present invention are to provide novel and improved methods and apparatus of such character.

2. General Description of Unstable Resonator Prior Art

Since their first introduction [1] into the literature and their first systematic experimental and analytical investigation in 1965, unstable resonators have been applied to excimer, ionic, molecular, solid state, liquid state and free electronic laser media emitting over the spectral range from the ultraviolet to the infrared. In this initial paper, mode losses were found by an ad hoc geometric optical analysis to be independent of laser end mirror sizes and, while the cavity losses were found experimentally to be expectedly large, the thought was expressed that diffractive output coupling would be useful for transverse mode control. In 1967, a second paper [2] listed three general attributes of unstable resonators: "1) Unstable resonators can have large mode volumes even in very short resonators; 2) The unstable configuration is readily adapted to adjustable diffraction output coupling and 3) The analysis indicates that unstable resonators should have very substantial discrimination against higher-order transverse modes".

The first experimental evidence of high transverse mode discrimination in a laser with unstable resonator was reported in [3]. Over time, these three attributes have been confirmed experimentally and theoretically many times. In 1967 and 1969, the concept of standing wave unstable resonators was expanded to a confocal concept when several innovative unstable ring resonators were introduced for the first time [4] and briefly discussed [5,6] with the comment expecting "a new possibility of constructing unidirectional ring generators" [5, p 1002]. These publications [4-6] introduced unstable ring cavities for the first time with and without intracavity focal regions. These ring geometries were further explored [5,6] and for the first time it was found that "even though the losses of modes propagating in opposite directions are identical, their substantially different volumes in such cavities can obviously favor a unidirectional generation" [5, p 1002].

Although the $CO_2$ laser medium was widely appreciated as one of a number of ideal candidates for the application of an unstable resonator system, it took nearly five years after the first introduction of unstable resonators [1] for details of such a resonator system to be reported in 1969 [7]. This work reported the use of a positive branch, confocal unstable resonator to generate a maximum cw output power of 22 watts and employed an annular coupler to generate a collimated fundamental output mode in the form of a near field annulus. Within a year of the first publication detailing the true diffraction losses in 1970 [8] of up to the first six lowest loss modes in a number of circular mirror, standing wave unstable resonator cavities, an unstable resonator system with a cw $CO_2$ output power of 30 kW was reported [9].

In 1972, a patent for a unique confocal ring unstable resonator was filed [10]. Also, about this time a number of experimental $CO_2$ laser studies were published exploring the very detailed characteristics of standing wave confocal unstable resonators [11], unidirectional symmetric confocal ring resonators [12], asymmetric confocal ring unstable resonators [13] and injection locking and regenerative amplification in standing wave and travelling wave unstable cavities [14]. Without exception, the experimental studies of the measured diffraction losses in confocal standing wave unstable cavities [11] was shown to be in complete agreement with the losses predicted by rigorous diffraction theory [8]. This agreement includes the details of the resonator loss characteristics near the transition between the lowest loss symmetric mode and the next lowest loss symmetric mode [Ref. 11, FIG. 17]. Likewise, unidirectional operation in travelling wave unstable resonators, first proposed mid-1968 [4] was achieved [12,13] as initially envisioned based only on the placement of the gain medium [5] within the unequal forward versus reverse mode volumes to favor one of the travelling wave directions. Moreover, the utility of travelling wave unstable resonators was shown to be a powerful resonator approach for applying to the concept of laser regenerative amplification [14]. In this case, unidirectional operation is shown to be strongly enhanced by the output mirror of the injection laser [Ref. 14, FIG. 35] which functions as the reversing mirror [Ref. 10, FIG. 24, element 24]. Unidirectional operation was shown to be easier to achieve in unstable optical ring regenerative amplifiers as compared to standing wave unstable resonators because no isolator is required [Ref. 10, FIG. 29].

All told, within a decade of first being introduced and analyzed the understanding of unstable optical resonators proceeded from an initial geometric optical approach [1] to a full iterative diffractive approach [8]. Along with this decade of theoretical work, $CO_2$ output powers increased over the range from 20 W in an initial standing wave device [7] to eventually cw output levels speculated to be in the multi-hundred kW cw with an asymmetric ring unstable device design [12,13].

It is interesting to note historically that the original concept of unstable optical resonator [1] proposed by Siegman in 1965 was never submitted to any patent office for patenting. Perhaps this was due to a lack of a good diffractive analytical model for unstable resonators in the early days of discussion and development. Meanwhile sufficient practical utility of confocal unstable resonators was predicted in 1968 and demonstrated experimentally in 1969 independently in [7] and [15]. Due to these investigations the positive branch unstable confocal (telescopic) resonator innovation has been patented in Russia [16] with the priority date 18.03.1968, but for a long time remained unknown to the world laser community. The ring unstable resonator innovation [4], proposed in 1968 was not ever submitted to any patent office until 1972. Retrospectively, this may be due to general misunderstanding of how completely the reverse wave in the cavity can be suppressed. In 1972 unstable ring laser resonators were patented in [10] due to development of efficient concepts of unidirectional operation of lasers with such resonators. In any event, a contemporary review of unstable resonator works of that period can be found in [6,17] and a most thorough discussion of all these and other types of unstable resonators along with detailed references in [18,19].

Stable ring resonators were well known in the laser art of the late 1960's, having been introduced earlier for, among other things, applications requiring the sensing of physical rotation of objects in an inertial gravitational field [20]. For this application, the difference frequency between the forward and reverse ring waves was found to be proportional to the angular rotation rate of the ring laser system. Unstable ring resonators are distinguished from stable ring resonators in that the mode diameters in the forward and reverse directions are generally different in unstable ring cavities but the same in stable rings. This is the basis of one of the ways unidirectional operation [5-6] can be achieved through the use of an intracavity aperture. Also, suppression of one of the oscillation directions in either symmetric [12] or [6,12,13] asymmetric unstable ring resonators can be achieved by judicious placing of the intracavity gain medium. To accomplish this, one places the gain medium intracavity where the mode volume for one of the travelling waves is large and the other travelling waves is smaller [17, FIGS. 16,17]. In a near symmetric unstable ring cavity, the ratio of forward to reverse wave output power was measured to be nearly a factor of 20 [12, FIG. 6]. Another way of achieving unidirectional operation is through the use of a reversing mirror [10, FIG. 2] located outside the cavity. Indeed, the aspect of unidirectionality in both stable and unstable symmetric aperture resonators is central to the notion of achieving regenerative amplification without the introduction of an optical isolator between the master oscillator and regenerative amplifier [14, FIGS. 8, 29]. Likewise, in such applications as diverse plasma diagnostics [21] or analysis of laser spectral composition [22], ring geometries are highly advantageous and even essential. In all these applications, inventions or devices, universally and without exception, it should not be surprising to find that there is always some discussion of both directions of propagation in the ring geometry.

Obviously, in a travelling wave optical geometry, since the opposing directions of propagation exit the optical device in distinct and unique directions, to discuss only one of the propagating directions is equivalent to discussing only half of the optical problem. Indeed, without such a discussion it is impossible to even know with certainty which of the two counter propagating modes is being used for output or which direction the output will be extracted. Conversely, absent such a discussion of both propagation directions, such inventions or devices have to be considered to be fundamentally standing wave in nature and application.

Beyond the simple concept of directionality that one finds as the most distinguishing feature between stable ring resonators versus stable standing wave resonators, the differences between unstable ring resonators and stable ring resonators is far richer and more complex. For example, in a stable ring resonator, the mode diameters of the forward and reverse waves at any location in the resonator and the total mode volume of two waves is the same. In contrast, the mode diameters of the forward and reverse waves at any location in an unstable ring resonator and the total mode volumes of the two counter propagating waves are generally not the same.

For illustrative purposes, suppose an unstable ring resonator is both confocal and asymmetric. For this discussion, confocal refers to the fact that the design is such that either the forward or reverse wave is extracted from the resonator as a collimated output. Asymmetric in this case refers to the fact that the distance between the beam expansion optics is greater (or less than) the remaining portion of the perimeter. For such an asymmetric confocal case [10], the resonator is confocal in only one ring direction. Restated, "this kind of directional asymmetry can only be accomplished in a [unstable] ring resonator" [19, p 839 line 28,29]. Therefore to completely and unambiguously describe the modal properties of unstable ring resonators, they have to be discussed entirely separately from stable standing wave, stable traveling wave resonators and also standing wave unstable resonators.

Consequently, with respect to inventions claiming novelty by employing various types of symmetric aperture or hybrid unstable resonators, such inventions cannot be said to include unstable ring resonators unless the patent itself specifically includes a discussion as to how one of the unstable ring mode directions will be effectively suppressed. Likewise, some discussion should be presented as to what the shape of the unsuppressed travelling mode will be relative to the laser gain medium if it remains unsuppressed, since being unsuppressed, will represent a direction from which significant laser output power will be emitted. In this regard, U.S. Pat. No. 5,097,479 [23] conforms to this notion by describing the suppression of one of the travelling waves in a two mirror, bifurcated unstable ring resonator for application with a slab type $CO_2$ laser medium. Likewise, U.S. Pat. No. 3,824,487 [10] conforms to this requirement since it discusses both the reverse wave and the accommodation of the unsuppressed wave to the large volume of gain medium. On the other hand, U.S. Pat. Nos. 4,719,639 [24] and 5,048,048 [25] fail in this regard and thus their utility is fundamentally self-limited to only hybrid standing wave unstable resonator geometries.

As herein disclosed, a laser with a travelling wave unstable resonator mode in one transverse dimension and either a waveguide or freespace gaussian mode in the orthogonal transverse dimension could be ideally suited for effectively coupling to any type of gain media with an elongated transverse cross section. This, of course, assumes that one of the unstable ring oscillation directions can be effectively suppressed. If so, this invention can be advantageously applied to excimer, ionic, molecular, solid state, liquid state or free electron laser media emitting over the spectral range from the ultraviolet to the infrared. Such media might be pumped by an RF, dc, e-beam, incoherent light, coherent light or free electron source, or any combination of these sources.

3. Description of RF Waveguide and Slab Laser Prior Art

While not limited thereto in its utility, the present invention is particularly well suited for applications in high power CO or $CO_2$ lasers with rectangular discharge geometries. In general, a rectangular discharge geometry is one wherein the transverse discharge cross section is elongated and the discharge is established most typically in either the short transverse dimension (slab devices) or the long transverse discharge dimension (slice devices). A separate case exists for slice devices where the discharge can be established perpendicular to the elongated transverse aperture. In all these cases, the ratio of the long transverse dimension to the short transverse dimension is large and is such that the long dimension is able to support a travelling wave unstable resonator mode in this long transverse dimension. Because of the elongated transverse cross section, such lasers can advantageously employ optical resonators that have different functional and propagational characteristics in the two different transverse dimensions. For the first time an optical resonator of such a geometry was experimentally investigated in [26] with a slab-type Nd-glass laser. The cavity comprised one planar and one convex cylindrical mirror such that the resonator was unstable along the longer transverse dimension of the slab (240 mm) and equivalent to a Fabry-Perot resonator in the shorter dimension (20 mm). Subsequently similar resonators were termed hybrid [27]. Thus two types of hybrid resonators to which the present invention is particularly applicable is one where the field in the short transverse dimension is described by either i) a waveguide mode or ii) a freespace gaussian mode while that in the long dimension is functionally described by an unstable resonator mode.

In a preferred embodiment of this invention, the optical configuration disclosed could find utility in high-power collision cooled waveguide gas lasers as disclosed in the "slab" discharge geometry of '639 [24] and in the "slice" discharge geometry as disclosed in '663 [28].

A slab waveguide laser excited by transverse high-frequency electric discharge comprises a waveguide formed by the reflecting surfaces of two elongated electrodes disposed parallel and in opposition to one another. The electrodes are made of a material highly reflective to laser radiation, thus ensuring low radiation losses in the waveguide. The gap between the electrodes is filled by a gas gain medium, which is excited by a transverse electric discharge generated in the gas medium when high-frequency pump power is applied to the electrodes. Mirrors making up a standing wave laser resonator are disposed near both ends of the waveguide formed by the elongated electrode surfaces. Besides exciting the gas by the electric discharge and acting as the upper and lower walls for the optical waveguide, the electrodes play a role of cooling members and provide heat removal from the gain medium. To ensure adequate collisional heat removal from the discharge, the electrodes are made of a material with a high thermal conductivity. In addition, the gap between the electrodes is made small and does not usually exceed a few mm. The electric field in such a discharge is directed essentially perpendicular to the cooling member surfaces and is oriented essentially along the height of the gain medium cross-section. The typical examples of such lasers are $CO_2$ [29,30], CO [31] and Xe [32] waveguide lasers with high-frequency excitation.

The "slice" laser discharge geometry disclosed in '663 [28] is also characterized by a gas gain medium excited by a high-frequency electric discharge and having an elongated transverse cross-section with a shorter and longer dimension. In distinction to the waveguide lasers the discharge region is defined by having the discharge electric field established perpendicular to the short transverse dimension. In slice lasers, the discharge is confined between a pair of closely spaced non-conductive cooling members. These cooling members are disposed in opposition to one another such that the gap between their surfaces opposed to each other is not only small enough to provide collision cooling of the gas filling the gap, but is suitable for guiding laser light between the non-conductive surfaces. Thus the discharge in the gas is excited by a system of electrodes disposed such that the electric field in the discharge chamber is essentially parallel to the surfaces of the cooling members, i.e. is directed transversely to the height (shorter dimension) of the gain medium cross-section. As disclosed in '663 [28] such "slice" lasers have a number of advantages in comparison with conventional waveguide lasers. These advantages include independent selection and optimization of discharge pressure and excitation frequency, the possibility of combined use of RF and dc discharge excitation sources and a moderated effect of boundary layers near the electrodes, among other virtues. Like slab devices, the slice discharge geometry is relevant to CO, $CO_2$, Xe as well as other gas laser media.

Clearly, the small bore transverse RF discharge work with a microwave and RF geometry reported in 1980 [33] and the stripline geometry reported in 1984 [34] both predate the filing of the slab geometry '639 [24] in early 1987. On the basis of prior art, then, slab lasers were limited for patent purposes to only waveguide operation in the smaller of the two transverse discharge dimensions and only unstable resonator operation in the larger dimension. In the slab waveguide geometry the modes of light propagating along the opposing electrode surfaces are defined entirely by these surfaces and their mutual disposal. The slice geometry '663 [28] and '256 [35], on the other hand, was an entirely new transverse discharge arrangement when disclosed for the first time by patent application. Therefore, the slice geometry is one that a much wider set of hybrid resonator types can be applied. For example, with respect to the slice geometries [32,35] the term "light guide" as used in "slice" lasers has a broader sense than merely a waveguide mode. Thus light propagation in the slice geometry can be either waveguide as in a slab device or a case where the intracavity radiation propagates without any interaction with the slice chamber sidewalls. One such case is where the intracavity mode in the small transverse slice dimension does not touch the sidewalls and is best described as freespace gaussian mode in functionality. Such a case takes place for instance in stable resonators where the laser beam is confined by the resonator mirrors and does not touch the light guide sidewalls because the sidewalls are not a boundary condition for this type of intracavity modal propagation.

In the present disclosure the term "light guide" will be used in the more general sense taking in mind that it comprises all modes of light propagation from the waveguide mode to the free space propagation of gaussian beams.

To increase the volume of the gain medium in a conventional symmetric aperture waveguide laser and the laser output power, while at the same time maintaining a small electrode gap, a wide-aperture waveguide laser with plane-parallel elongated electrodes of width considerably in excess of the electrode gap was proposed in U.S. Pat. No. 4,719,639 [24]. The electrode surfaces reflecting laser radiation form in this laser the upper and lower walls of an optical waveguide of a large width, wherein the radiation propagating between the electrodes is confined by this waveguide only in the directions perpendicular to the electrode surfaces. The waveguide is open in the directions parallel to the electrode surfaces, and therefore the laser beam propagating along the waveguide can expand in these directions in both opposite senses as in free space. A convex and a concave confocal mirror making up a positive-branch standing wave unstable resonator with a magnification M>1 are disposed near the waveguide ends. In each transit from one mirror of this resonator to another and back, the laser beam expands by approximately M times in the two opposite directions wherein the beam is not confined by the electrode surfaces and can expand as in free space. To form only one output beam of a solid, i.e. filled-in cross section in a laser with such a resonator, the mirrors are usually disposed such that the axis of the unstable resonator formed by them is shifted to pass near one of the open sides of the electrode gap. The output laser beam is coupled out of the resonator from the other side of the electrode gap, more particularly, near the edge of the convex mirror overlapping only a part of the waveguide cross section. Such a "halved" configuration of the resonator allows formation at the laser exit, even for electrodes of a large width, of a beam of approximately rectangular solid cross section with a close to diffraction-limited divergence in each of the two transverse directions. The large electrode width provides excitation of a large gain medium volume and, as a result, a high output laser power.

It is known, however, that elongated discharge aperture lasers with a positive-branch unstable resonator having low magnification M are highly sensitive to resonator mirror misalignment, particularly to a change in their angular position in the plane parallel to the electrodes [25], as well as to wedge-type optical inhomogeneities in the same plane. Such inhomogeneities usually form in the laser gain medium under discharge pumping. This was not unexpected given earlier published works [6,7] with conventional unstable resonators. In slab or slice $CO_2$ lasers magnification M does not, as a rule, exceed 1.2 to 1.5. Therefore, if special measures to increase the rigidity of the construction and to improve the gain medium optical homogeneity are not taken, mirror misalignment and gain medium inhomogeneities in such lasers result in a substantial deformation of the radiation mode structure. This will result in a sharp drop in output power, degradation of beam divergence, and an angular shift of the output beam, which cannot be tolerated in most applications. The need for taking measures to solve these problems will increase the laser cost.

It is well known to those of ordinary skill in the art of slab lasers that a shift of the positive-branch unstable resonator axis to one of the electrode gap sides will result in transition of the resonator configuration from a full resonator to the half configuration. However, it is not well appreciated that some intracavity radiation will still escape from the resonator on the side of the electrode gap where the shifted axis is situated. Thus, while such a shift in the resonator axis allows the formation of essentially one output beam of a solid cross section in place of two separate output beams, this advantageous feature comes at the cost of forcing some radiation from the side of the resonator where it cannot be combined into the useful output beam. This entails a loss of radiation to the cavity thus reducing overall laser efficiency. Worse, such radiation can be inadvertently coupled back into the desirable intracavity mode by stray reflections and force an undesirable higher order modes to compete for the full gain medium volume and thus the laser output.

To eliminate these difficulties, U.S. Pat. No. 5,048,048 [25] disclosed the use of a negative-branch linear unstable resonator with a magnification M<−1 in the wide dimension of the discharge aperture. The disclosed confocal geometry is formed by two concave mirrors with different radii of curvature having a common focal point inside the resonator. The confocal negative branch geometry can produce a one sided, filled in output beam as a result of the reversal of left for right which occurs at the confocal plane of the two concave resonator mirrors. In each pass through the focal point (beam focal waist), the laser beam propagating along the waveguide between the mirrors of the negative-branch unstable resonator becomes inverted in cross section, so that after passing through the focal point the rays of the beam that propagated on one side of the resonator axis (which is a common normal to the surfaces of both mirrors) will emerge on the other side of this axis. Due to the laser beam rays passing alternately on one and the other sides of the resonator axis, the misalignments caused by the resonator mirror angular shifts in the plane parallel to the electrodes become efficiently compensated for |M| on the order of 1.2 to 1.5, as are compensated efficiently also the wedge-type optical inhomogeneities in the gain medium, which makes the resonator only weakly sensitive to such misalignments and optical inhomogeneities [6,7].

To provide one-sided coupling of the radiation out of the negative-branch hybrid unstable resonator of '048[25], the size of one of the resonator mirrors is chosen such that the distances from the resonator axis to the opposite edges of this mirror in the plane parallel to the electrode reflecting surfaces differ by more than |M| times. The other resonator mirror is chosen large enough that it does not constrain beam expansion in the waveguide. On the next pass through the resonator, the radiation propagating along the resonator on the side of its axis opposite to the side on which the radiation is coupled out is reflected to the side where the beam exits, and is coupled out as the useful output beam. As a result, the laser output radiation is a solid cross-section beam which, despite the beam expanding in the resonator freely in two opposite directions, exits it on one of its sides only. Thus, the presence of a focal waist in a negative-branch unstable resonator reduces the passive losses of the radiation generated in the resonator compared to the positive-branch halved unstable resonator, in which beam expansion in two opposite directions brings about inevitably passive power losses from the resonator on its side opposite to the one where the useful output beam is coupled out.

However, because of the high local beam power density, the presence of a focal waist in the gain medium of a negative-branch unstable resonator may give rise to undesirable nonlinear effects in the gain medium and to gas breakdown, particularly in high-power pulsed lasers. Besides, the efficiency of use of the gain medium volume in such a resonator is lower than that in a positive-branch resonator because of the gain medium being nonuniformly filled by the beam. Reducing the laser dimensions, which is usually achieved by folding the optical axis of the resonator by means of an additional mirror, is also difficult in this arrangement, because the mirror placed into a negative-branch resonator to fold its axis will be too close to the focal waist to withstand the severe irradiation expected at high laser-power levels. Moreover, the mirrors of a negative-branch unstable resonator should have a large curvature; indeed, their curvature radii should be on the order of the distance between the mirrors. As a result, to reduce the effect of the curvature of these mirrors on field distribution over the waveguide height, i.e., along the normals to the electrode surfaces, one has to use mirrors of a complex shape, with different curvatures in the two mutually perpendicular directions, or to take special measures for wavefront matching, thus introducing additional losses in the resonator as disclosed in U.S. Pat. No. 5,123,028 [36]. Besides, if the electrode width is increased noticeably, the increase in the width of the large-curvature mirrors is accompanied by a fast growth of spherical aberrations entailing, in its turn, a substantial increase in the beam divergence, which also places an obstacle on the way to using negative-branch unstable resonators in high-power waveguide lasers. Indeed, while FIG. 4 of '048 [25] shows that there is an advantage to a negative branch configuration over that of a positive branch design, the power levels are noted to be relatively low. At the present time there is some indication that at the several kW output power level in $CO_2$ slab lasers there is some significant beam steering that may be caused by gas heating or other non-linear effects at the common focal region of the confocal mirror pair.

U.S. Pat. No. 5,097,479 [23] proposed a wide-aperture waveguide gas laser with a positive-branch ring unstable resonator completed with means for forcing unidirectional oscillation in the resonator [23, FIG. 10, element 80]. This embodiment of a waveguide gas laser is pumped with high-frequency power applied between a pair of spaced electrodes. The ring resonator disclosed employs only two intracavity mirrors, that is why a complete ring resonator round trip must rely on a series of distributed reflections in the precisely curved bifurcated waveguide structure. In this split bi-waveguide structure an unstable ring optical resonator is formed with a closed axial contour to permit the extraction of an output beam with a solid cross section.

The ring resonator depicted in '479 [23] is formed by optically combining two precisely curved branches of two adjacent optical waveguide structures into a single optical unit. The precisely curved, bifurcated waveguide structure halves are coupled optically together by means of a pair of mirrors disposed at the ends so as to direct the laser beam impinging on the mirror from one waveguide branch into the other waveguide branch. As a result, each of the mirrors turns the beam striking it in the plane transverse to the electrode surfaces. Thus, a pair of mirrors and two curved waveguide branches form in this laser a ring resonator with a closed axial contour lying in the plane which crosses the electrode surfaces essentially at right angles and faces with its opposite sides the open side ends of the waveguide. The ring resonator formed in this way in this plane provides a compact laser design, because the height of these waveguide branches is small compared to their width and length. However, since it is impossible to form a travelling wave resonator of any kind using only two mirrors, the ring resonator optical circuit must rely on a proper, precise and equal curvature of both waveguide branches. Clearly, the continuous reflections in the two curved bifurcated waveguide branches will add considerable intracavity optical loss and significant mechanical complexity to the laser fabrication process as well. This is especially evident when it is remembered that one of the electrodes in a RF pumped slab laser must be at an elevated RF potential. On balance, the apparent simplicity of using only two intracavity ring mirrors must be weighed against the complexity arising from the requirement of achieving a very low distributed optical reflection loss along both curved waveguide branches. This low distributed loss must be achieved at the same time as keeping the elevated potential RF electrode from shorting out to the grounded RF electrode. Moreover, to provide one-sided beam extraction from said positive-branch ring unstable resonator, the axial contour of this resonator is shifted such that it passes near one of the open sides of the electrode gap. As can be seen from the optical diagram of '479 [23], this hybrid ring resonator approach cannot be applied to a single plane waveguide or a single plane guided wave structure since it only uses two intracavity optical elements. Furthermore, because of the bifurcated waveguide structure, the ring resonator cannot be made asymmetric.

Because the traveling wave unstable resonator of '479[23] has no focal waists inside the cavity, one-sided diffractive output extraction from the laser is provided only by shifting the axial contour to one of the open sides of the electrode gap. Consequently, this laser suffers from all the disadvantages discussed in relation to slab lasers with a positive branch, halved linear unstable system. Among these disadvantages are a high sensitivity to resonator mirror misalignment and wedge-type inhomogeneities in the gain medium, as well as passive radiation losses on the resonator side to which the resonator axial contour is shifted occurring when extracting the useful radiation in the form of one beam. If anything, the bifurcated waveguide, traveling wave unstable resonator system of '479[23] adds, rather than eliminates, complexities of the other single slab hybrid resonator slab devices.

SUMMARY OF THE INVENTION

The principal object underlying the present invention, as applied to high-power, high-frequency excited, collision cooled gas lasers, is to provide a hybrid unstable ring resonator system which has a low sensitivity to laser resonator mirror misalignments and wedge-type optical inhomogeneities in the gain medium, as well as reduced passive power losses in coupling out radiation from the resonator in the form of one beam with a solid cross section.

This object is accomplished in that in a collision cooled gas laser with high-frequency-excitation, which comprises a pair of cooling members, each including an extended surface opposed such as to form a light guide for propagation of optical radiation in the gap between said surfaces, a laser gas, disposed in said gap to generate laser radiation via excitation of said gas by an electrical discharge provided by high-frequency electric power supplied to the gas, and mirrors, forming a traveling wave ring resonator with a closed axial contour to generate in said light guide a laser beam, with said mirrors, in accordance with the invention, being disposed such that said axial contour of said resonator lies essentially in the plane, which is located between said surfaces forming said light guide for optical radiation and faces with its opposite sides said surfaces of cooling members, said traveling wave ring resonator being unstable in said plane so that part of said beam expanding in said resonator is coupled out of the laser as an output beam of solid cross-section, and the number of said mirrors and their curvatures being such that any ray belonging to said beam and propagating along said light guide inside said axial contour of the resonator emerges after a round trip to propagate outside of said axial contour of the resonator, and any ray belonging to said beam and propagating along said waveguide outside of said axial contour of the resonator emerges after a round trip to propagate inside said axial contour.

The arrangement of the closed ring-resonator axial contour in a plane lying between the surfaces of the cooling members means that each of the mirrors of this ring resonator turns the beam reflected by it in said plane. As a result of each such turn, the part of the beam that propagated along the light guide on the inner side of the closed resonator axial contour emerges on its outer side, and vice versa. Due to such an inversion of the beam by each of the mirrors, chosen properly in their number and curvature, any ray of the laser beam propagating along the light guide on the inner side of the resonator axial contour will emerge on the outer side of the resonator axial contour after a complete resonator round trip. Conversely, any ray of the laser beam propagating along the waveguide on the outer side of the resonator axial contour will emerge on the inner side of the resonator axial contour, i.e., any ray passing at a distance from the resonator axial contour will switch after a resonator round trip to the opposite position with respect to said axial contour in the plane in which the beam expands as in free space.

Thus, the proposed traveling wave ring resonator provides passage of the laser beam rays lying in said plane alternately on both sides of the ring resonator axial contour. The location of the ring resonator axial contour in the plane located between the surfaces of the cooling members, or essentially in this plane, is for positive-branch unstable ring resonators the necessary condition for reducing the resonator sensitivity to wedge-type perturbations in the resonator that are oriented in this plane. If the resonator axial contour lies in the transverse plane, i.e., in the plane transverse to the cooling member surfaces, as, for instance, in a laser with an unstable ring resonator embodied in accordance with U.S. Pat. No. 5,097, 479 [23], beam reflections from the resonator mirrors will not provide such an inversion of this beam in the plane of its free expansion, which is necessary to reduce the resonator sensitivity to wedge-type perturbations in this plane.

Due to the laser beam rays passing alternately on both sides of the ring-resonator axial contour, a laser embodied in accordance with this invention provides compensation of the misalignments caused by angular shifts of the resonator mirrors in the plane lying between the cooling members, as well as compensation of wedge-type optical inhomogeneities in the gain medium, which are oriented in said plane. Therefore, the proposed laser is relatively insensitive to such resonator mirror misalignments and optical inhomogeneities compared to known positive branch hybrid laser designs, in which the axial contour of the ring unstable resonator lies in the plane perpendicular to the electrode surfaces and, as a result, the sensitivity to wedge perturbations oriented in the plane of free beam expansion is not reduced.

Besides, due to the laser beam rays passing alternately on both sides of the ring-resonator axial contour, the output beam of solid cross section in the proposed laser is coupled out only on one side of the axial contour, despite the fact that the beam free expansion in the resonator occurs in both opposite transverse directions, in which it is not confined by the electrode surfaces. For instance, the part of the laser beam propagating along the inner resonator edge, i.e., on the inner side of the axial contour, emerges after a complete round trip on the outer resonator side, where it can be coupled out as a useful output beam. Also, passive power losses on the inner side of the axial contour are practically eliminated. Thus, according to this invention, passive power losses from the resonator are reduced compared to known positive-branch ring unstable resonators, in which the axial contour lies in a plane transverse to the electrode surface and, as a result, beam expansion in two opposite directions along the electrode surfaces brings about passive power losses from the resonator near the edge which is opposite to the one from which an output beam with a solid cross section is coupled out.

In contrast to a prior art slab waveguide laser with a negative-branch linear unstable resonator, using a positive branch travelling wave resonator as taught by the present invention having an axial ring contour lying in the plane passing between the surfaces of the cooling members provides alternate passage of beam rays on both sides of the axial contour. Significantly, this is accomplished without the need of a focal waist in the resonator. Because the laser embodied in accordance with the present invention does not require the use of a focal waist, this laser will not suffer the undesirable nonlinear effects and breakdown in the gain medium caused by the focal waist. Moreover, as taught by the present invention the gain medium is used in a volumetric efficient way due to the more uniform filling of the medium by the intracavity radiation flux. Reducing the laser dimensions by folding the laser resonator optical axis is here also simplified. Besides, there is no need to use large-curvature spherical mirrors and take the corresponding measures to reduce the deleterious effect of these mirrors on the field distribution over the waveguide height.

In the preferred embodiment of the proposed laser, the number of said mirrors forming said traveling wave ring resonator is odd, and their curvatures are such that the laser beam propagating in said waveguide does not have focal waists. If a laser beam does not have focal waists, in order for it to become inverted after a complete round trip, the number of the mirrors making up the ring resonator must be odd.

In accordance with the present invention, only one of said mirrors forming said traveling wave ring resonator needs to be made convex to provide the required magnification of the unstable resonator. In this embodiment, to simplify the laser construction and cost the other mirrors making up the ring resonator can be planar.

In an alternate embodiment of the present invention, one of the mirrors of the unstable ring resonator can be convex another can be concave with the remainder being planar. Employing a ring unstable resonator with at least one convex and one concave mirror can be seen to more easily provide for a desired curvature of wavefront at the laser output.

Compared to a slab laser made with the prior art technology of '479[23], in the preferred embodiment of the proposed laser, said surfaces of the cooling members can be essentially flat and disposed in parallel. This obviously simplifies the laser design and fabrication, as well as permits one to raise its efficiency compared to the laser containing curved waveguide branches. This is obvious because using curved waveguide branches in a laser can force the waveguide mode field to increase toward the electrode facing the discharge gap with its concave surface, as a result of which part of the excited gain medium located near the opposite electrode is used less efficiently.

In a preferred embodiment of the proposed invention, the distances from the edges of each mirror forming the resonator to the point of intersection of the mirror surface with said axial contour are such that they provide coupling out of radiation from the resonator in the form of a single beam, having a solid cross section and located in the vicinity of one of the edges of one of said mirrors, and confine in this way expansion of the beam in the resonator.

In other possible embodiments of the invention, however, said resonator can comprise a means for deflection of a fraction of radiation adjacent to the edge of the beam formed by resonator mirrors to provide coupling of said fraction out of the resonator and to confine in this way the beam expansion in the resonator.

The preferred embodiment of the proposed laser includes means for providing favorable conditions for propagation of radiation along the ring resonator predominantly in one of the two possible opposite directions. Such means permit one to provide essentially unidirectional lasing in the traveling wave laser resonator, thus offering a possibility of obtaining the maximum radiation power in a single compact output beam.

Said means providing favorable conditions for propagation of radiation predominantly in one of said opposite directions can comprise a feedback (reversing) mirror disposed such that it does not affect essentially the radiation propagating in the resonator in the first of said two directions, but reflects in the opposite direction at least a fraction of the radiation propagating in the resonator in the second direction opposite to said first direction, such that said fraction of the radiation is propagated in the resonator in the first direction.

In another possible embodiment of the invention, one of the resonator mirrors can have a hole, with its center disposed at the point of intersection of said mirror with said axial contour, and said means providing favorable conditions for propagation of radiation predominantly in the first of the two possible directions comprise a feedback mirror installed behind said hole such that it reflects in the first direction at least part of the radiation propagating through said hole in the second direction such that at least part of the radiation passes back through said hole and propagates along the resonator in the first direction.

Due to the feedback mirror, a coupling is established between the two counter-propagating waves, which results in an additional amplification of one of these waves. Mode competition setting in the gain medium within the resonator in the stage of lasing creates favorable conditions for the beam to propagate predominantly in the first direction, so that the laser starts to operate essentially in a unidirectional traveling wave mode.

In yet another embodiment of the present invention, power from a lower power laser could be injected into a much higher power device so that coherent light from the low power device could control the wavelength of the high power device. In one arrangement the output from the lower power device could be injected into the reverse power direction at the high power output coupling mirror, or in another arrangement low power radiation could be injected into the high power cavity via a hole in one of the unstable ring resonator mirrors. In any of these embodiments of the present invention the lower power device would be directionally isolated from any power extracted from the higher power device.

Parameters of the light guide in the embodiments generally discussed above and consequently the mode of light propagation in the light guide can be different. In some embodiments said traveling wave ring resonator can be stable in direction perpendicular to said plane of the resonator axial contour so that the beam is practically not guided by the cooling member surfaces.

In some other embodiments said cooling members can be disposed such that they define a waveguide propagation mode of light in said light guide.

BRIEF DESCRIPTION OF THE DRAWINGS

The invention is illustrated by the drawings, in which

FIG. 5a and FIG. 5b illustrate one of possible schemes to provide unidirectional lasing in the collision cooled gas laser constructed in accordance with this invention.

FIG. 6 shows one more variant of the embodiment of the collision cooled gas laser constructed in accordance with this invention and having 5 mirrors.

To present the idea of the invention in a more revealing way, the drawings are made not to scale.

DESCRIPTION OF THE DISCLOSED EMBODIMENTS

Figure 1:
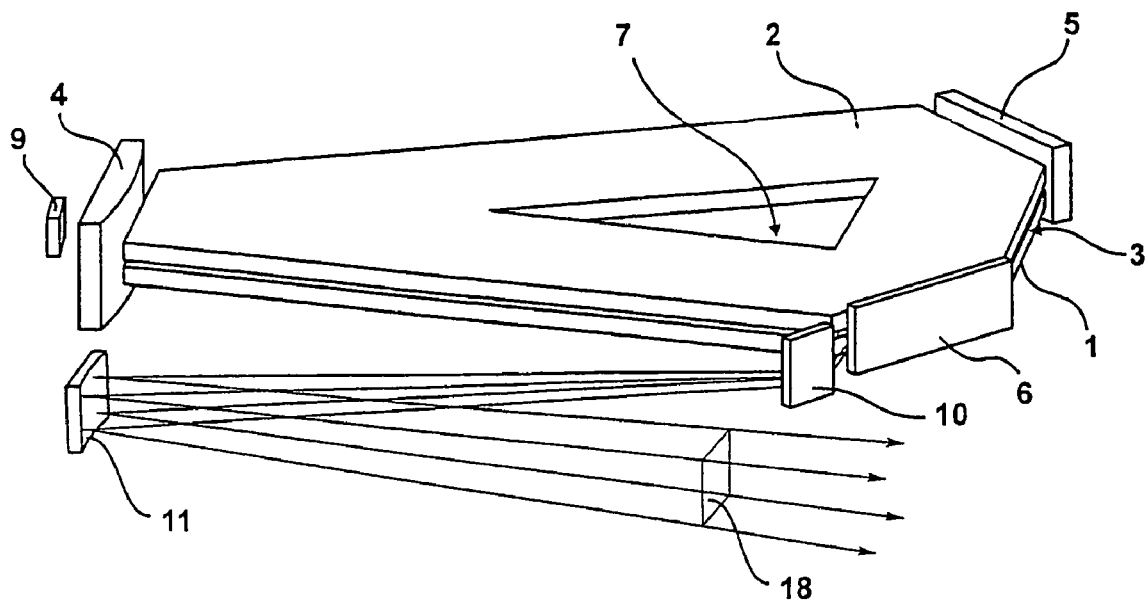
FIG. 1 is a perspective view of one of the variants of the embodiment of the collision cooled gas laser constructed in accordance with this invention.

The collision cooled gas laser with high-frequency transverse excitation shown in FIG. 1 comprises a pair of cooling members 1 and 2 separated by gap 3 in which a gaseous gain medium (not shown) is disposed, for instance, a typical gas medium of a waveguide $CO_2$ laser including $CO_2$, $N_2$, He, and other gases. In conventional slab waveguide lasers the cooling members simultaneously are used as electrodes. The discharge in "slice" lasers is excited by additional electrodes (not shown in the Figure).

The surfaces of cooling members 1 and 2 disposed in opposition are spaced close enough to form a light guide for propagation of optical radiation. The electrodes are connected to a high-frequency generator (not shown) supplying high-frequency pump power to the gain medium. Cooling members 1 and 2 may also be accomplished by cooling means (not shown) to increase heat removal from the cooling members.

The outer contour of each of the cooling members 1 and 2 has triangular shape with truncated vertices, near which, in the immediate vicinity of the outer edge of gap 3, are disposed mirrors 4, 5, and 6 making up a positive-branch ring traveling wave unstable optical resonator with the closed axial contour lying in the plane which passes between the surfaces of cooling members 1 and 2 and faces with its opposite sides the surfaces of cooling members 1 and 2, respectively.

Figure 2:
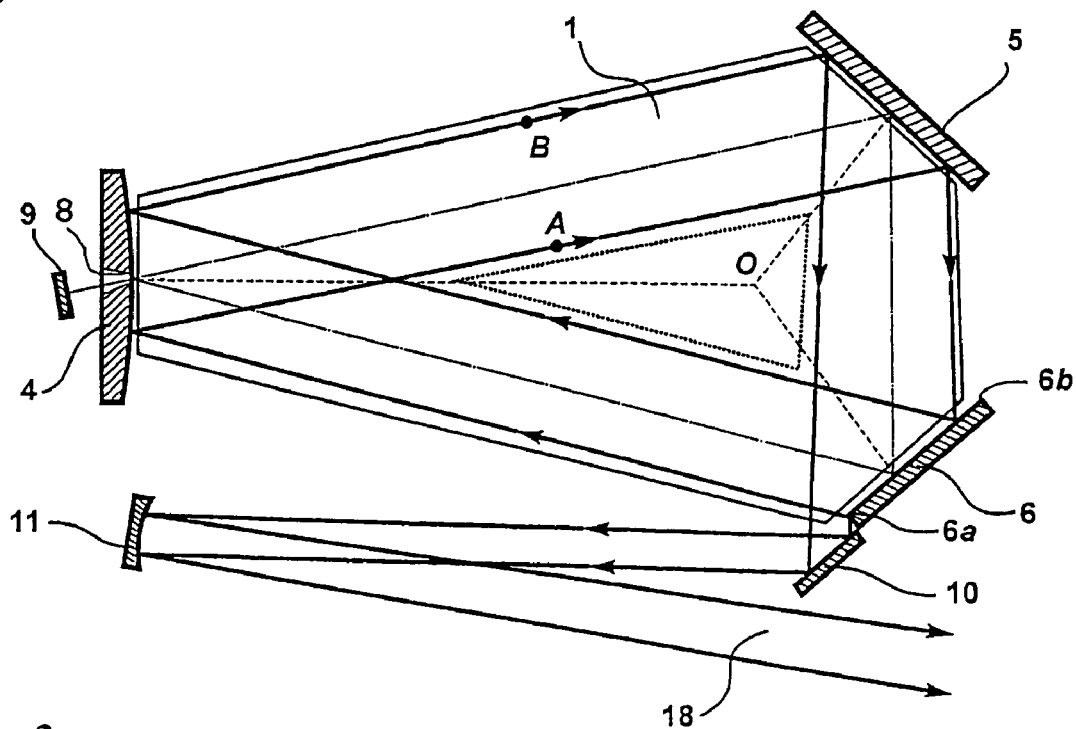
FIG. 2 is a top view of a section through the electrode gap of the collision cooled laser shown in FIG. 1.

As shown in FIG. 2, to form a traveling wave ring optical resonator, mirrors 4, 5, and 6 are disposed relative to one another such that they enclose a triangular axial contour (shown by a dash-dotted line). The bisectrices of the angles in the corners of this triangular contour (shown by dashed lines) are simultaneously normals to the mirror surfaces such that the angle of incidence of an axial ray at the mirror surface is equal to the angle of reflection for every mirror. The axial contour of the resonator shown in FIGS. 1 and 2 lies in the midplane equidistant from the opposite surfaces of cooling members 1 and 2 making up the light guide.

As can be seen from FIGS. 1 and 2, by arranging a closed ring-resonator axial contour in a single plane lying between the surfaces of the cooling members, one can provide, for equal areas of these members, a more compact design compared to prior art linear unstable resonator designs. Also, because laser beam propagation in a single plane lying between the surfaces of cooling members 1 and 2 is not confined by anything, there is essentially no possibility of additionally turning the radiation in this plane, and suffering the significant distributed reflection losses by the curved waveguide walls of prior art. Therefore, compared to the prior art as disclosed in '479 which employs two mirrors, two complicated and precisely curved waveguide planes and distributed reflection along the four curved waveguide surfaces to complete one round trip through the ring cavity, the present invention employs three mirrors and only one simple axial resonator contour to complete a cavity round trip. By eliminating the distributed reflection along the two precisely curved waveguide surfaces and replacing it with reflection from a single intracavity optic, the present invention will have significantly less intracavity loss than that of the two mirror prior art ring resonator concept. Furthermore, even in a three mirror ring, the instant invention permits the beam expansion portion of the resonator to be comprised, for example, of mirrors 5 and 6 in FIG. 2. This permits the ring of the present invention to be made confocal asymmetric. It is not possible in the two mirror symmetric arrangement of the '479[23] prior art. Finally, the inversion of left for right in intracavity radiation in the present invention can be achieved without an intracavity focal region necessary in the prior art linear unstable cavities.

For the traveling wave ring optical resonator shown in FIG. 2 to be a positive-branch unstable ring resonator, mirror 4 in this variant of embodiment of the invention is chosen convex, and mirrors 5 and 6 are plane. The convex mirror 4 may be, for instance, spherical with a radius of curvature R chosen such as to provide an optimum magnification M of the unstable resonator. The magnification of the ring resonator shown in FIG. 2 (which is about that of the transverse beam dimension in the waveguide midplane attained in a round trip of this ring resonator) is given, for a small enough angle of beam incidence on the convex mirror, by the expression $$M = \frac{\sqrt{RL+L^2}+L}{\sqrt{RL+L^2}-L},$$

where L is one half of the resonator axial contour length. The magnification M of an unstable resonator is usually chosen such as to provide an optimum efficiency of energy extraction from the laser gain medium. The optimum value of M can be determined by the well-known methods employed to calculate the unstable resonator parameters in waveguide gas lasers. For instance, for a typical collision cooled waveguide $CO_2$ laser with an electrode gap of 2 mm, an axial contour 3.5 m, long, and pump frequency of 81 MHz, the optimum value of M may constitute about 1.3-1.4.

The distances from the point of intersection of the resonator axial contour with the surface of each of mirrors 4, 5, and 6, which make up the resonator, to the edges or these mirrors are chosen such as to provide coupling the radiation out of the resonator in the form of a single beam of a solid cross section near an edge of one of the mirrors, e.g. edge 6a of mirror 6, thus, to confine the beam expansion in the resonator.

For instance, the dimensions of mirrors 4, 5, and 6 along the normals to the surfaces of the cooling members, exceed substantially the gap height to prevent laser power leakage over the mirror edges. The size of mirror 6 in the direction transverse to said normals is chosen such that the distance measured in the waveguide midplane from the point of intersection of the resonator axial contour with the surface of mirror 6 to the first edge 6a of this mirror is less than that to the second edge 6b of this mirror by not less than M times. The dimensions of the other mirrors, 4 and 5, in said transverse direction are large enough that the laser beam propagating in the resonator and incident on these mirrors does not spill past their edges, i.e., that these edges do not confine beam expansion in the resonator.

The laser shown in FIG. 1 includes also means providing propagation of radiation predominantly in one of the two possible opposite resonator round-trip directions, in this particular example, clockwise. For this purpose, a small hole 8 (for $CO_2$ lasers the hole diameter may be typically 1 mm) is provided in mirror 4 on the resonator axis. Hole 8 is oriented such that the extension of the part of the resonator axis passing from mirror 5 to mirror 4, i.e., in the direction of the counterclockwise resonator round trip, passes through this hole. A small plane feedback mirror 9 intercepting said extension of the part of the resonator axis and oriented perpendicular to it is disposed behind said hole 8 on the other side of the reflecting surface of mirror 4. Mirror 9 is aligned such that the wave propagating counterclockwise along the ring resonator and passing through hole 8 is reflected from mirror 9 and is propagated again through hole 8 back into the resonator, to become added there with the wave propagating clockwise in the resonator.

The laser shown in FIGS. 1 and 2 comprises also a means for deflecting the output laser beam in the desired direction, said means being formed by a plane mirror 10, as well as a concave mirror 11 serving to impart the desired curvature to the beam wavefront.

The laser design shown in FIGS. 1 and 2 is meant only as illustration. In other variants of the invention embodiment, for instance, more than one of the mirrors making up the ring resonator may be convex. One or more of the resonator mirrors can be made concave to collimate the output beam or to impart the desired curvature to the beam wavefront.

The number of the mirrors making up the traveling wave ring resonator in a laser constructed in accordance with the present invention may be more than three. For instance, in the waveguide gas laser shown schematically in FIG. 3 the number of the mirrors making up the ring resonator is four, with mirrors 12 and 13 being concave, and mirrors 14 and 15, convex.

In the collision cooled gas laser presented schematically in FIG. 6 the number of the mirrors in the traveling wave ring resonator is five (mirrors 21 to 25). The mirror curvatures and their sizes are chosen such that the ring cavity being unstable in the plane lying between the surfaces of the cooling members has the required magnification M, and the field distribution inside the resonator provides a good filling of the gain medium 26. In the variant shown in FIG. 6 mirrors 21 and 24 are convex, mirrors 22, 23 are concave and mirror 25 is plane.

Note also that at least some of the mirrors making up the ring resonator may constitute not single elements, as shown in the corresponding drawings, but parts of a common mirror surface. Besides, in addition to mirrors, the ring resonator may include other known elements used to form such resonators.

Cooling members 1 and 2 must not necessarily be plane parallel. For instance, the surfaces of cooling members 1 and 2 may be curved with opposite signs of curvature in a plane transverse to the light guide walls and passing through sections of the axial contour. The closed axial contour of the resonator still lies in this case essentially in one plane, as in the above-considered variant of the invention embodiment. In other variants of the embodiment, the distance between the cooling members may be varied depending on the transverse coordinates in order to control the beam wavefront curvature in the midplane of the light guide symmetry.

It is obvious also that the axial contour of a traveling wave ring resonator may deviate within certain limits from the midplane passing between the surfaces of the cooling members, as long as this deviation does not degrade noticeably the laser output parameters.

The cooling members may also be made of separate sections. When the cooling members are used as electrodes the pump power can be supplied separately to each of them, as is well known in the art of RF excited slab waveguide or slice guided wave lasers.

Figure 3:
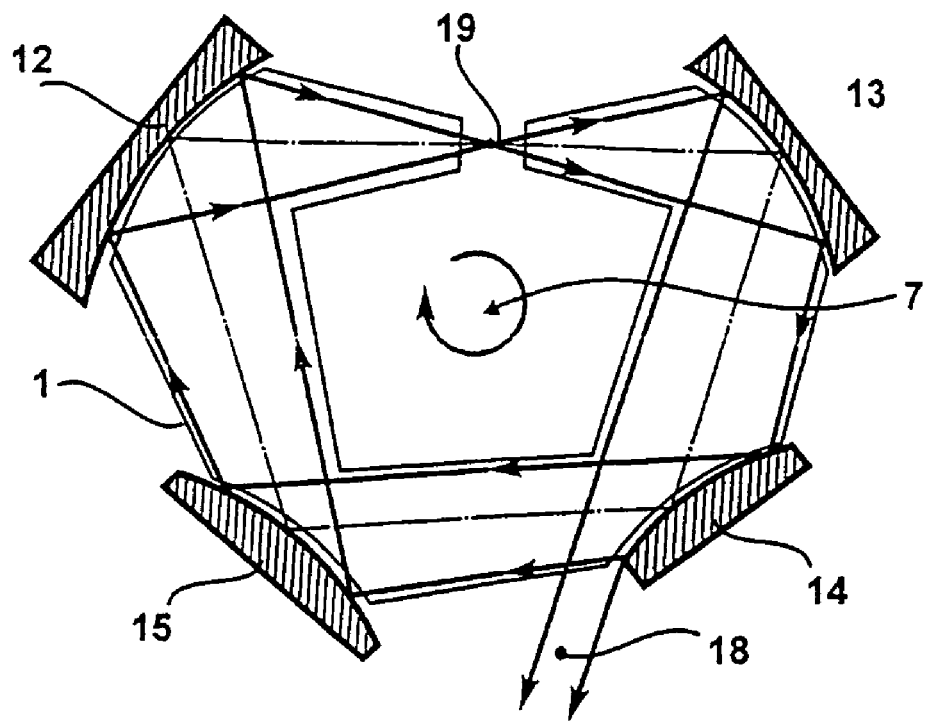
FIG. 3 shows another variant of the embodiment of the collision cooled gas laser constructed in accordance with this invention.

Coupling the laser power out of the resonator must not necessarily be done near the edge of one of the mirrors, as shown in FIGS. 1 through 3. For instance, in the collision cooled gas laser constructed in accordance with the principles of this invention and shown schematically in FIG. 4, the resonator is provided by a separate means to couple the beam out of the resonator in the form of mirror 16, which is disposed on the outer side of the resonator axial contour.

To provide unidirectional lasing in a traveling wave ring resonator, holes in resonator mirrors are not necessarily needed. For instance, feedback mirror 17 in a collisional cooled gas laser embodiment shown schematically in FIGS. 5a and 5b is disposed behind the resonator output mirror, near its edge, in the shadow region for a wave propagating clockwise in the resonator. At the same time, feedback mirror 17 is aligned such as to reflect back the incident wave propagating counterclockwise through the resonator. In this variant of embodiment of the invention, convex mirror 4 serves as the output mirror near whose edge the beam is coupled out of the resonator.

In the variant of the embodiment presented schematically in FIG. 6 another possible design of the feedback is shown with an intermediate mirror 27 and a roof-reflector 28 in the feedback path. As shown in FIG. 6, a polished lateral surface of mirror 21 is used as mirror 27 to direct back into the resonator the incident counterclockwise radiation 20 after its reflection from properly disposed roof-reflector 28.

To operate the collision cooled traveling wave ring laser shown in FIGS. 1 and 2, high-frequency pump power is supplied from an external generator to excite the gas gain medium by electric discharge. In the case of the conventional waveguide laser it is done via cooling members 1 and 2 which are made in this case of a conductive material and play a role of electrodes. In order not to pump the area not filled by the intracavity radiation and, to increase the laser efficiency a depression 7 in one of the electrodes can be made to prevent excitation of the discharge in the area of the depression.

To operate the "slice" laser with the traveling wave ring resonator as shown in FIGS. 1 and 2 the high-frequency pump power (or its combination with dc power) is supplied to additional electrodes (not shown in the Figures). In both cases, when excited, the gain medium generates optical radiation propagating in the waveguide (light guide) formed between the opposite surfaces of cooling members 1 and 2. The radiation, whose direction of propagation coincides with that of the axial contour of the ring resonator, is guided along this contour in a closed trajectory and is amplified in the gain medium, which results in self-excitation of the laser beam near the resonator axial contour. When propagating along the ring unstable resonator, the width of this laser beam increases in the midplane of the cooling members (in the plane of the drawing of FIG. 2) M times in each resonator round trip due to the curvature of the convex mirror 4, i.e., the beam expands as in free space. Beam expansion in the directions transverse to the surfaces of cooling members 1 and 2 is confined by these surfaces, thus forming the fundamental waveguide or Gaussian mode depending on the light guide height.

Each of the three resonator mirrors, 4, 5, and 6, turns the laser beam cross section in the waveguide midplane passing between said electrodes. After each such turn, any ray of the beam reverses its position relative to the resonator axial contour. No beam inversion occurs between mirrors 4, 5, and 6, because this resonator does not contain concave mirrors and, hence, there are no focal waists. Because the number of mirrors in such a resonator is odd, any ray propagating in the resonator on one side of the resonator axial contour emerges to propagate on the other side of the resonator axial contour after a complete resonator round trip. To illustrate this situation, the ray in FIG. 2 passing clockwise along the ring resonator through point A located on the inner side of the axial contour emerges, after a complete resonator round trip including consecutive reflection from mirrors 5, 6, and 4, at point B located on the outer side of the axial contour.

The width of a paraxial laser beam propagating along a ring unstable resonator expands in the midplane M times in each resonator round trip, until after some pass one of the beam edges spills past edge 6a of mirror 6, as shown in FIG. 2. However, the beam does not spill past the other edge 6b of said mirror 6, because the distance from the axial contour to edge 6b is at least M times larger than that from the axial contour to edge 6a. After the next beam round trip along the resonator and another increase of the width of the beam remaining in the resonator by M times, the part of the laser beam that was near the second edge 6b of mirror 6 emerges, due to the beam inversion in the ring resonator constructed in accordance with the invention, to propagate on the other side of the axial contour, spills past the first edge 6a of mirror 6 and will be coupled out of the resonator. Thus, extraction of radiation from the resonator near the first edge 6a of mirror 6 constrains further beam expansion in both opposite transverse directions in which it expands as in free space. At the same time, the edges of the other mirrors, 4 and 5, are far enough from the resonator axial contour that the beam propagating in the resonator does not spill past the edges of these mirrors, thus providing extraction of the radiation from the resonator in the form of one rather than two or more beams. The part of the broadened beam that spilled past edge 6a of mirror 6 will leave the laser after consecutive reflection from mirrors 10 and 11 in the form of an output beam 18 with a close-to-rectangular solid cross section. The curvature of the concave mirror 11 provides collimation of the output beam in the transverse plane or, should this be needed, formation of a converging out of the diverging beam exiting the ring unstable resonator.

Thus, in an embodiment of a laser made with the disclosed innovation, like that of FIGS. 1 and 2, the single side beam coupling from the resonator is effected due to the alternate passage of the rays making up the laser beam on different sides of the resonator axial contour, similar to the way in which single side beam coupling in waveguide lasers with a negative-branch linear unstable resonator is achieved by passing the rays alternately on both sides of the linear resonator axis. This linear negative branch arrangement permits the avoidance of passive power losses from the resonator which occur in the positive-branch halved unstable resonator with single side beam coupling. At the same time, in contrast to the prior art negative-branch linear unstable resonators, the inversion of the beam cross section in the disclosed ring resonator constructed in accordance with the invention, does not require a focal waist for this purpose and is attained due to the ring resonator axial contour being arranged in a plane passing between the surfaces of cooling members 1 and 2, and to the properly chosen number and curvatures of mirrors 4, 5, and 6 making up the ring resonator. The absence of beam focal waists in the resonator shown in FIGS. 1 and 2 provides highly uniform beam intensity distribution and, hence, a high efficiency of use of the gain medium volume, and prevents undesirable nonlinear effects and breakdown in the gain medium.

Due to the rays forming the beam in a ring resonator constructed according to the present invention striking any of mirrors 4, 5, and 6 alternately on both sides of the axial contour, the possible angular deviations of these mirrors in the light guide midplane from their required angular positions are canceled out similar to the way this occurs in negative-branch linear unstable resonators with a focal waist. Optical wedge inhomogeneities in the gain medium are canceled in a similar way, because the positive path difference gained in one pass by the outer part of the beam as a result of its propagation, for instance, over the "thick" side of such a wedge oriented in the light guide midplane will be canceled in the next transit. This is a result of the same part of the beam acquiring in the next transit a negative path difference, because the outer part of the beam will now be the inner part and will propagate across the "thin" side of the same wedge. Thus, alternate passage of the rays making up a laser beam on opposite sides of the ring resonator axial contour provides a substantial reduction of the sensitivity of a ring resonator constructed in accordance with the invention to misalignments of mirrors 4 through 6 making up the resonator, and to wedge-type optical inhomogeneities in the gain medium, without any need of using focal waists in the resonator for this purpose.

Thus, one embodiment of present invention suitable for a collision cooled laser with a traveling wave ring resonator combines the advantages of prior art linear positive ranch hybrid waveguide lasers such as no intracavity focal region with the advantages of prior art linear negative branch lasers such as low sensitivity to angular misalignments, low sensitivity to wedge inhomogeneities and single sided, filled-in output beam coupling.

As can be seen from the above discussion, for inversion in the transverse cross section to be achieved, a laser constructed in accordance with the teachings of this invention should preferably employ an odd number of intracavity mirrors (3,5,7 etc.). With this arrangement, the beam cross section becomes inverted in the long dimension without having to pass through an intracavity focal region. However, if a negative branch ring laser is constructed according with the teachings of this invention to purposefully have an intracavity focal region then in order to retain the inversion of the beam after a complete round trip, the number of mirrors in the ring cavity must be even. Alternatively, according to the teachings of this invention, one could design a ring resonator to have an even number of intracavity mirrors. For such a situation, as shown in FIG. 3, if an inversion of left for right is deemed to be advantageous in a ring cavity with an even number of mirrors, an intracavity focal region must be employed to provide the reversal. For example, in FIG. 3, such waist 19, formed due to the beam being focused by concave mirror 12, is disposed between mirrors 12 and 13. However, in contrast to lasers with negative-branch linear unstable resonators, the waist region in a laser with a ring resonator can be removed from the pumped gain medium, and therefore the presence of said waist will not degrade substantially the intracavity laser parameters due to any deleterious non-linear effects.

Figure 4:
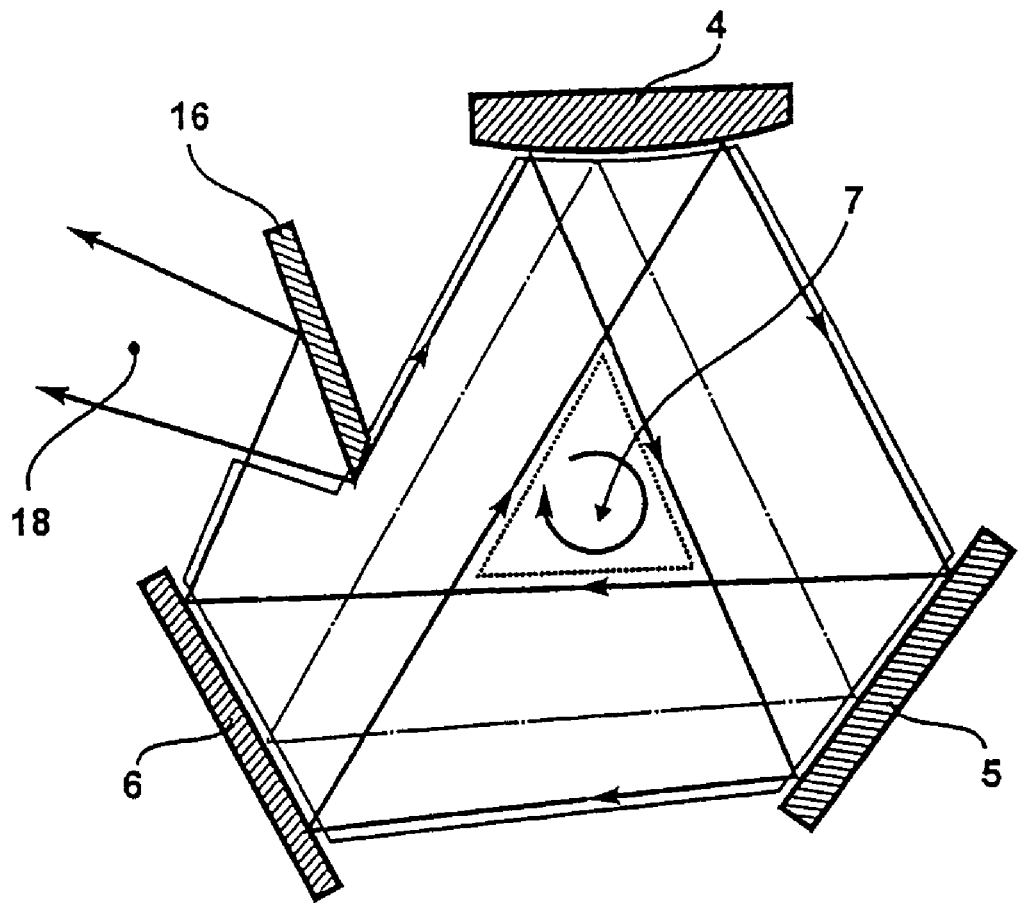
FIG. 4 shows one more variant of the embodiment of the collision cooled gas laser constructed in accordance with this invention.

In contrast to the cavity arrangement shown in FIG. 2, wherein beam expansion in the resonator is confined by the resonator mirror 6, in the laser shown schematically in FIG. 4 the beam is confined by an additional mirror 16. In this case mirror 16 is disposed such that it deflects and couples out of the resonator the part of the beam adjoining the edge of the laser beam formed by the optical resonator mirrors and located on the outer side of the axial resonator contour. Using this separate means to deflect the beam in order to couple it out of the resonator simplifies the alignment of the laser optical system and permits one to easily control the output beam width by properly shifting mirror 16 in the transverse direction.

The feedback mirror 9 shown in FIGS. 1 and 2 makes possible preferential clockwise propagation of the beam in the resonator, thus providing essentially unidirectional lasing. Because of its small size, hole 8 in mirror 4 does not affect noticeably the wave guided clockwise along the resonator. The comparatively small part of the power carried by this wave that passes through hole 8 is deflected by mirror 9 and does not return back into the resonator. At the same time, part of the wave propagating counterclockwise in the resonator passes through hole 8 and is reflected by mirror 9 through hole 8 back into the resonator, to propagate there clockwise. Thus, a coupling is introduced between the two counter-propagating waves, which gives rise to an additional amplification of one of these waves; in the example considered, the wave propagating clockwise is amplified. Mode competition in the gain medium forming in the stage of the onset of lasing in the resonator creates favorable conditions for the clockwise propagating wave, and the laser starts to operate essentially in a unidirectional mode. Such a reversing mirror is particularly effective with homogeneously broadened gain media such as YAG or $CO_2$. As shown by calculations and experiments carried out by the authors of this invention, the presence of even a comparatively weak coupling between counter-propagating waves in the resonator is sufficient to provide essentially unidirectional laser operation.

In the cavity embodiment shown schematically in FIGS. 5*a* and 5*b*, unidirectional operation is achieved without using resonator mirror holes, whose presence in waveguide lasers with a small electrode gap is not always desirable. FIG. 5*a* shows useful beam 18 propagating clockwise in the resonator, and FIG. 5*b*, the counterclockwise beam 20 to be suppressed. Mirror 17, due to its being disposed behind the output mirror 4, in the shadow region, does not introduce perturbations into the clockwise-propagating beam 18. At the same time, the counterclockwise beam 20 exits the resonator at an angle different from that of beam 18 and, as a result, becomes intercepted by mirror 17. The beam incident at mirror 17 is reflected by it in the opposite direction and is added to the beam propagating clockwise in the resonator. This results, as in the laser shown in FIGS. 1 and 2, in creation of favorable conditions for the clockwise beam, and the laser starts operating essentially in the unidirectional regime.

In the laser shown schematically in FIG. 6 another variant of the feedback design is shown. Here the counterclockwise-propagating beam undergoes additional reflection from lateral side 27 of mirror 21 before reflecting from feedback reflector 28. The angle between the surfaces of mirrors 27 and 21 near their common edge 29 can be adapted to increase the angle between the beams 20 and 18. The increase of this angle simplifies interception of the counterclockwise-propagating beam 20 by feedback reflector 28 and its reflection back into the ring resonator. The use of roof-reflector 28 instead of feedback mirror 17, decreases significantly the requirements to accuracy of the feedback reflector angular positioning, provided edge 30 is properly positioned with respect to edge 29.

In an initial embodiment of this invention, a cw output power of 350 W was extracted from $CO_2$ slab laser with a three mirror unstable ring resonator. The travelling wave unstable resonator components of the hybrid resonator consisted of two planar and one 60 m convex spherical maximum reflectivity intracavity mirrors to form a cavity having a perimeter of 2 L=1.3 m and a geometric magnification of 1.3. The 2 mm discharge gap operated at a total pressure He—$N_2$—$CO_2$:1-1-6 equal to 70 Torr. With a cavity configured similar to that of FIG. 5*a*, the reverse power was measured to be suppressed to about a factor of 100 or 20 dB lower than that of the 350 W forward laser output. The one-sided, filled-in, asymmetric output beam with a cross-section of 2 mm by 12 mm was measured to be very close to diffraction limited for each of the output dimensions.

The above-considered variants of a high-frequency-excited collision cooled gas laser are presented only for illustration. The invention can be embodied using any appropriate types of elements confining the gap, mirrors, gain media, pumping means and other components commonly employed in such devices. Those who are skilled in the laser art will recognize that in place of mirrors, or alongside them, one can use any equivalent optical means capable of providing the required transformation of optical beams and change of their orientation. Therefore, while preferred embodiments have been shown and described, various modifications and substitutions may be made to these embodiments without departing from the spirit and scope of the invention. Accordingly, it is to be understood that the present invention has been described by way of illustration and not by limitation.

REFERENCES CITED

[1] A. E. Siegman, "Unstable Optical Resonators for Laser Applications", Proceedings of the IEEE, March 1965, pp 277-287.

[2] A. E. Siegman and R. Arrathoon, "Modes in Unstable Optical Resonators and Lens Waveguides", IEEE, J. Quantum Electronics, vol. QE-3, 156-163, April 1967).

[3] Yu. A Anan'ev, N. A. Sventsitskaya, and V. E. Sherstobitov, "Transverse mode selection in a laser with convex mirrors", Sov. Phys.-Doklady v. 13, p. 351-352 (October 1968) (In Russian: "Doklady Akademii Nauk SSSR", v. 179, No 6, pp. 1304-1305, (July 1968), submitted 22.05.1967).

[4] Yu. A. Anan'ev, N. S. Sventsitskaya and V. E. Sherstobitov, "Properties of a Laser with an Unstable Resonator", Soviet Physics JETP, 28, 1, p. 69-74, January, 1969 (In Russian: Zh. Eksp. Teor. Fiz, 55, 130-140, July, 1968).

[5] Yu. A. Anan'ev and G. N. Vinokurov, "Some properties of Ring-Type Unstable Cavities with Angular Selection of Radiation", Soviet Physics, 14, 7, p. 1000-1002, January, 1970 (In Russian: Zhurnal Teknicheskoi Fiziki, 39, 7, pp 1327-1330, July 1969).

[6] Yu. A. Anan'ev, "Unstable resonators and their applications", "Sov. J. Quant. Electron.", v. 1, p. 565-586 (May-June 1972) (In Russian: "Kvantovaya Elektronika", Ed. N. G. Basov, No 6, p. 3-28, 1971).

[7] W. F. Krupke and W. R. Sooy, "Properties of an Unstable Confocal Resonator $CO_2$ Laser System", IEEE J. Quantum Electronics, vol. QE-5, pp 575-586, December 1969.

[8] A. E. Siegman and H. Y. Miller, "Unstable Optical Resonator Loss Calculations Using the Prony Method", Applied Optics, Vol. 9, No. 12, p. 2729-2736, December 1970.

[9] E. V. Locke, R. A. Hella, L. Westra and G. Zeiders, "Performance of an Unstable Oscillator on a 30-kW CW Gas Dynamic Laser", IEEE J. Quantum Electronics, vol QE-7, p. 581-583, December 1971.

[10] Carl. J. Buczek, Peter P. Chenausky and Robert J. Freiberg, "Unstable Ring Laser Resonators", U.S. Pat. No. 3,824,487, filed 8 May 1972

[11] R. J. Freiberg, P. P. Chenausky and C. J. Buczek, "An Experimental Study of Unstable Confocal $CO_2$ Resonators", IEEE J. Quantum Electronics, vol. QE-8, p. 882-892, December 1972.

[12] R. J. Freiberg, P. P. Chenausky and C. J. Buczek, "Unidirectional Unstable Ring Lasers", Appl. Optics, Vol. 12, No. 6, p. 1140-1144, June 1973.

[13] R. J. Freiberg, P. P. Chenausky and C. J. Buczek, "Unstable Asymmetric Travelling Wave Resonators for High-Power Applications", IEEE J. Quantum Electronics, Vol. QE-9, p 716ff, June 1973.

[14] Carl J. Buczek, Robert J. Freiberg and M. L. Skolnick, "Laser Injection Locking", Proc. IEEE, Vol. 61, No. 10. October 1973.

[15] Yu. A. Anan'ev, G. N. Vinokurov, L. V. Koval'chuk, N. A. Sventsitskaya and V. E. Sherstobitov "Telescopic—resonator Laser", Zh. Eksp. Teor. Fiz., 58, 786-793, 1970 (submitted Jul. 29, 1969); Sov. Phys. JETP, v. 31, No 3, p. 420-423, 1970.

[16] Authors certificate SU 274254, filed 18.03.1968, Bulletin No 24, 1970, p. 63. Authors Yu. A. Anan'ev, N. A. Sventsitskaya, V. E. Sherstobitov (In Russian);

[17] A. E. Siegman, "Unstable Optical Resonators", Appl. Optics, vol 13, No. 2, p 353-367, February 1974.

[18] Yu. A. Anan'ev, "Optical resonators and laser beam divergence", Moscow, Nauka, 1979 (In Russian).

[19] A. E. Siegman, "Lasers", pages 858-922, Univ. Science Books, copyright 1986, ISBN 0-935702-11-5.

[20] W. M. Mecek and D. T. M. Davis, Jr., "Rotation Rate Sensing with Travelling-Wave Ring Lasers", Appl. Phys. Lett., 9, 1966 p, 55ff).

[21] Roger A. Haas, Peter P. Chenausky and Robert J. Freiberg, "Laser Plasma Diagnostic Using Ring Resonators, U.S. Pat. No. 3,885,874, Filed 11 Jan. 1974, issued 27 May 1975.

[22] A. S. Osipov, G. A. Ponomarev, Yu. P. Maiboroda, V. K. Batalin, V. G. Kurganov, and V. A. Levada, "Ring Cavity Resonator for the Analysis of the Spectral Composition of the Radation from a $CO_2$ laser", Pribory i Tekhnika Eksperimenta, No. 1, p. 186-187, January-February 1973.

[23] Hans Opower, "Folded Waveguide Laser", U.S. Pat. No. 5,097,479, filed 28 Dec. 1990, issued 17 Mar. 1992.

[24] John Tulip, "Carbon Dioxide Slab Laser", U.S. Pat. No. 4,719,639, filed 8 Jan. 1987, issued 12 Jan. 1988.

[25] Junichi Nishimae, Kenji Yoshizawa, Masakazu Taki, "Gas Laser Device" U.S. Pat. No. 5,048,048, filed 9 Aug. 1990, issued 10 September 10 1991.

[26] Yu. A. Anan'ev, V. N. Chernov, and V. E. Sherstobitov, "Solid-state laser with a high spatial coherence of radiation", Sov. J. Quant. Electron., v. 1, p. 403-404 (January-February 1972) (In Russian: "Kvantovaya Elektronika", Ed. N. G. Basov, No 4, p. 112-113, 1971).

[27] P. E. Jackson, H. J. Baker and D. R. Hall, "$CO_2$ large-area discharge laser using an unstable-waveguide hybrid resonator.", Appl. Phys. Lett. Vol. 54, No. 20, 15 May 1989, p. 1950-1952.

[28] Peter Chenausky, "Rectangular Discharge Gas Laser", U.S. Pat. No. 5,748,663, filed 6 Jun. 1997, issued 5 May 1998.

[29] D. R. Hall and H. J. Baker, "Area Scaling boosts $CO_2$-laser performance.", *Laser Focus World*, October 1989, p. 77-80.

[30] A. Lapucci, A. Labate, F. Rossetti, and S. Mascalchi, "Hybrid stable-unstable resonators for diffusion-cooled $CO_2$ slab lasers.", Vol. 35, No. 18, Applied Optics, June 1996, 3185-3192.

[31] H. Zhao, H. J. Baker and D. R. Hall, "Area scaling in slab rf-excited carbon monoxide lasers" Appl. Phys. Lett., Vol. 59, No. 11, 9 September 1991, p. 1281-1283.

[32] P. P. Vitruk, P. J. Morley, H. J. Baker and D. R. Hall, "High power continuous wave Xe laser with radio frequency excitation.", Appl Phys. Lett. Vol. 67, No. 10, 4 September 1995, p. 1366-1368.

[33] P. Chenausky, L. M. Laughman and R. J. Wayne, "Radio-frequency and Microwave Excitation of $CO_2$ Lasers", Paper TuKKy CLEOS Conference, 1980.

[34] A. Gabi, R. Hertzberg, and S. Yatsiv, "Radio-Frequency Excited Stripline CO and $CO_2$ Lasers", paper TuB4, CLEO Conference, Jun. 19, 1984.

[35] Peter Chenausky, "Slice Laser", U.S. Pat. No. 6,134, 256, filed 4 May 1998, issued 17 Oct. 2000.

[36] James L. Hobart, J. Michael Yarborough, Joseph Dallarosa and Philip Gardner, "RF Excited $CO_2$ Slab Waveguide Laser", U.S. Pat. No. 5,123,028, filed 12 Oct. 1990, issued 16 Jun. 1992.

The invention claimed is:

1. A collision cooled gas laser with high-frequency excitation comprising:
   a pair of cooling members, each including an extended surface, opposed such as to form a light guide for propagation of optical radiation in the gap between said surfaces;
   a laser gas, disposed in said gap to generate laser radiation via excitation of said gas by an electric discharge provided by high-frequency electric power supplied to said gas,
   mirrors, forming a traveling wave ring resonator with a closed axial contour to generate a laser beam in aid light guide,
   wherein:
   said mirrors are disposed such that said axial contour of said resonator lies essentially in the plane, which is located between said surfaces of said cooling members forming said light guide for optical radiation and faces with its opposite sides said surfaces of said cooling members, said traveling wave ring resonator being unstable in said plane so that part of said beam expanding in said resonator is coupled out of the laser as an output beam of solid cross-section, the number of said mirrors and their curvatures being such that any ray belonging to said beam and propagating along said light guide inside said axial contour of the resonator emerges after a round trip to propagate outside of said axial contour, and any ray belonging to said beam and propagating along said light guide outside of said axial contour of the resonator emerges after a round trip to propagate inside said axial contour.

2. The collision cooled gas laser as defined in claim 1 wherein:
   the number of said mirrors forming said ring resonator is odd and their curvatures are such that the laser beam propagating in said light guide does not have focal waists within the resonator.

3. The collision cooled gas laser as defined in claim 1 wherein:
   at least one of said mirrors of the ring resonator is made convex, and the other mirrors are plane.

4. The collision cooled gas laser as defined in claim 1 wherein:
   said surface of said cooling members are essentially flat and disposed in parallel.

5. The collision cooled gas laser as defined in claim 1 wherein:
   the distances from the edges of each mirror forming the resonator to the point of intersection of the mirror surface with said axial contour are such that they provide coupling out of radiation from the resonator in the form of a single beam, having a solid cross-section and located in the vicinity of one of the edges of one of said mirrors, and confine in this way expansion of the beam in the resonator.

6. The collision cooled gas laser as defined in claim 1 wherein:
   said laser comprises means for providing favorable conditions for propagation of radiation along the ring resonator predominantly in one of the two possible opposite directions.

7. The collision cooled gas laser as defined in claim 6 wherein:
   said means for providing favorable conditions for propagation of radiation predominantly in one of said opposite directions comprise a feedback mirror disposed such that it does not affect essentially the radiation propagating in the resonator in the first of said directions, but reflects in opposite direction at least a fraction of the radiation propagating in the resonator in the second direction opposite to said first direction, such that said fraction of the radiation is propagated in the resonator in the first direction.

8. The collision cooled gas laser as defined in claim 6 wherein:
   one of the resonator mirrors has a hole, with its center disposed at the point of intersection of said mirror with said axial contour, and said means providing favorable conditions for propagation of radiation predominantly in the first of the two possible directions comprise a feedback mirror installed behind said hole such that it reflects in the first direction at least part of the radiation propagating through said hole in the second direction such that at least part of the radiation passes back through said hole and propagates along the resonator in the first direction.

9. The collision cooled gas laser as defined in claim 1 wherein:
   said traveling wave ring resonator is stable in direction perpendicular to said plane of said axial contour.

10. The collision cooled gas laser as defined in claim 1 wherein:
    said surfaces of said cooling members define a waveguide propagation mode of light in said light guide.

* * * * *